Inventor
Percy Raymond Allison
By Watson, Cole, Grindle & Watson
Attorneys

Patented Sept. 16, 1952

2,610,869

UNITED STATES PATENT OFFICE 2,610,869

FLEXIBLE HOSE END CONNECTION

Percy Raymond Allison, Felpham, England, assignor to Flight Refuelling Limited, London, England, a British company Application April 22, 1949, Serial No. 89,020
In Great Britain March 30, 1949

9 Claims. (Cl. 285—86)

This invention relates to end connections for flexible hoses.

A general object of this invention is the provision of an improved adaptor or end connection assembly for a flexible hose comprising an outer cover of woven fabric of textile material, metal or the like composed of longitudinal and circumferential or oblique strands, with or without external armouring of metal wire, and an inner fluid-tight liner of rubber or the like material or of flexible corrugated metal tubing. The invention is considered to be of especial applicability to hoses of relatively heavy duty type, a typical example of which have an internal diameter of two inches or upwards and be capable of sustaining an internal fluid pressure of several hundred pounds per square inch and an axial tension of more than one ton.

Included in this general object is the provision of an improved method of securing the end of the flexible hose to the rigid parts of the adaptor.

Further objects of the invention include the provision of an adaptor and a method of joining it to a flexible hose which will meet the following requirements:

(1) The adaptor and joint must be fluid-tight and pressure-retaining;

(2) The woven outer cover must carry substantially all the axial tension; and (3) The end of the liner must be internally supported without obstructing or seriously restricting the bore.

How these and other objects are attained will appear from the following description of two specific embodiments of the invention, given by way of example only without implied limitation of the scope of the invention as defined in the appended claims, and having reference to the accompanying drawings, in which:

Figure 1:
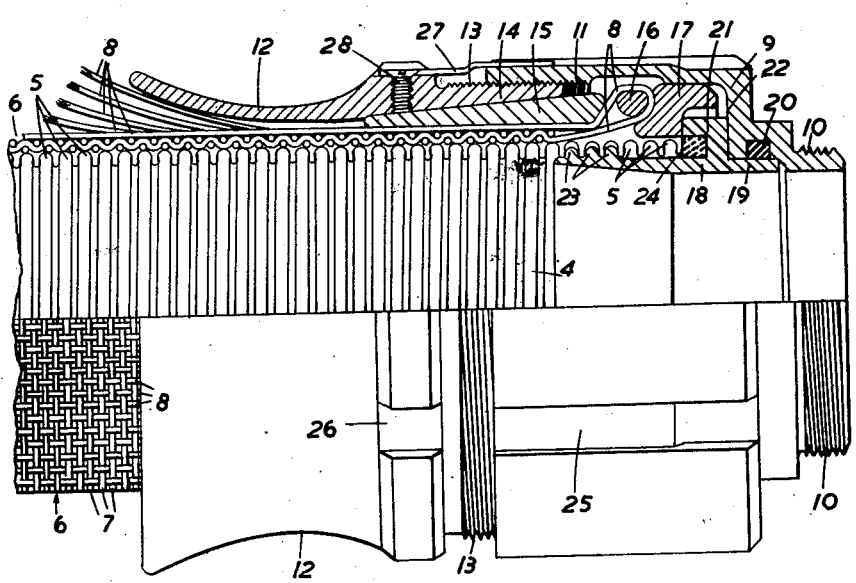
Figure 1 shows in elevation, partly in axial section, one embodiment of the invention, applied to a hose having a flexible metallic liner.

The hose shown in Figure 1 comprises a substantially unstressed fluid-tight liner 4 of thin sheet metal formed with a closely coiled helical corrugation 5, and a stress-carrying outer cover 6 of stout, woven material having circumferential strands 7 and longitudinal strands 8.

The adaptor comprises the following parts, all being of metal and rigid: An outer sleeve 9, externally threaded at 10 for connection to a hose-coupling member (not shown), and internally threaded at 11, a clamping sleeve 12, hereafter referred to as the "cone-housing," externally threaded at 13, and internally tapered at 14, a split-sleeve 15, hereafter referred to as the "split-cone," having an external taper mating with the internal taper 14 of sleeve 12, the taper being gradual, a loose ring 16, a loose abutment collar 17 and an inner sleeve 18.

The inner sleeve 18 is formed with a spigot end 19, fitting closely in a counter-bored recess of the outer sleeve 9, having an internal groove holding a sealing ring 20 of rubber or neoprene, and has an external flange 21 which butts against a shoulder 22 formed in the outer sleeve 9. The inner sleeve 18 is extended to enter the end of the hose-liner 4 and has a few turns of external round-profile screw-thread 23 which screw into the helical corrugations 5 of the liner. The end of the liner 4 enters a recess 24 formed by undercutting the flange 21 of the inner sleeve 18, and is secured in this recess by soldering, the recess being completely filled with solder so as to seal the joint between the liner 4 and sleeve 18 completely.

The abutment collar has a sliding fit in the enlarged part of the outer sleeve 9 and butts against the inner face of the flange 21 of sleeve 18.

The circumferential strands 7 of the outer cover 6 are stripped from the part of the hose lying within the cone-housing 12, and the longitudinal strands 8 are wrapped round the loose ring 16 and laid back along the outside of the cover 6 within the split-cone 15, between which and the abutment collar 17 the loose ring 16 with the strands 8 wrapped round it are gripped when the screw-thread 11 of the outer sleeve 9 and the screw-thread 13 of the cone-housing 12 are brought into engagement and run-up.

The outer sleeve 9 and cone-housing 12 are provided with external key-ways 25, 26, respectively, engageable by key-wrenches for screwing up the joint, and locking is effected by a loose key 27 engaging the key-ways 25, 26 and secured by a set-screw 28.

Assembly is carried out as follows: The cone-housing 12 and loose ring 16 are first slipped over the hose. Next the end of the outer cover 6 is unravelled for a distance greater than the length of the adaptor and the unravelled circumferential strands 7 removed, leaving the longitudinal strands 8 intact. These strands are then folded back over the loose ring 16 and laid along the outside of the outer cover 6 and the two halves of the split-cone 15 are placed over them and retained by sliding the cone-housing 12 forward till its taper 14 lightly grips the taper of the split-cone. The liner 4 is then cut off to the correct length and solder is run into the last two turns of the external helical groove of the corrugation 5 to fill them completely. After slipping the abutment collar over the end of the liner, the inner sleeve 18 is screwed into the liner 4, by threaded engagement of the screw-thread 23 with the inner helical groove of the corrugation 5.

The groove 24 of the inner sleeve 18 having been previously filled with solder, heat is applied to melt the solder in the groove 24 while completing the screwing home of the sleeve 18 to cause the end of the liner 4 to enter the groove 24 and become embedded in the solder retained in it, this operation being performed with the hose-end hanging vertically to prevent the solder running out of groove 24. Finally the outer sleeve 9 is screwed onto the cone-housing 12 and when the joint is tightly clamped it is locked by the key 27 and screw 28, the latter being locked by centre-punching.

Figure 3:
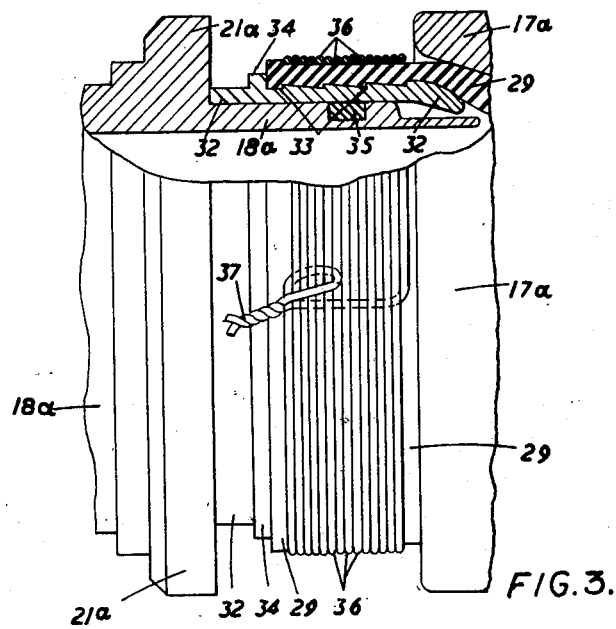
Figure 3 is a partial view, partly in section, of the embodiment of Figure 2, with the outer sleeve of the adaptor removed.
Figure 2:
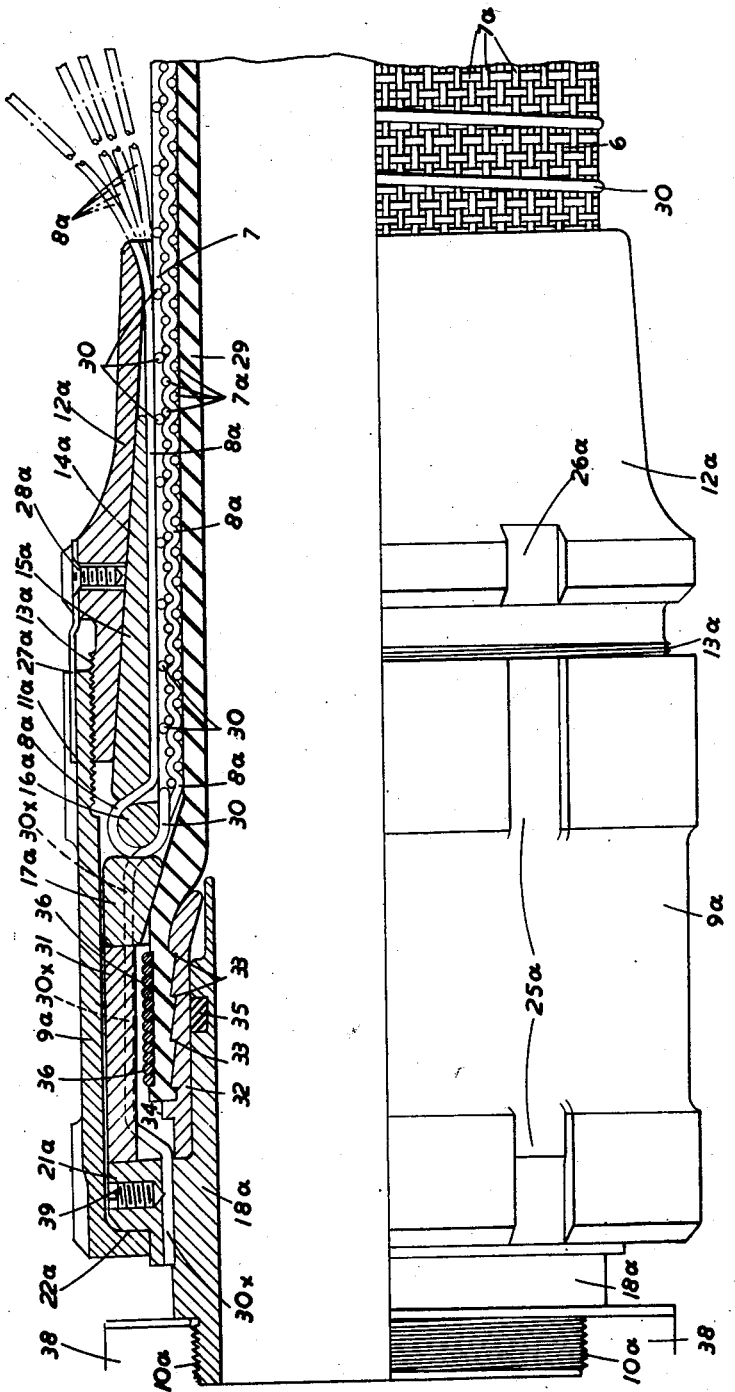
Figure 2 is a similar view of a second embodiment, applied to a hose having a liner of rubber or similar material.

In the embodiment of Figures 2 and 3, in which parts corresponding to similar parts in Figure 1 are identified by like reference numerals but distinguished by the affix $a$, the hose comprises a stress-carrying woven outer cover 6$^a$ composed of circumferential strands 7$^a$ and longitudinal strands 8$^a$, and a substantially unstressed fluid-tight flexible liner 29 of rubber, neoprene or the like material, e. g. a so-called "plastic" composition. In this instance, the hose is armoured externally with a closely wound helix of stout metal wire 30 surrounding or incorporated in the outer cover 6$^a$.

As in the previous example, the adaptor comprises an outer sleeve 9$^a$ shouldered at 22$^a$, an inner sleeve 18$^a$ having a flange 21$^a$ abutting on the shoulder 22$^a$, a loose abutment collar 17$^a$, a loose ring 16$^a$, a split-cone 15$^a$ and a cone-housing 12$^a$ engaging the split-cone on mating tapers 14$^a$. In this instance, the adaptor also includes a spacer tube 31 separating the abutment collar 17$^a$ from the flange 21$^a$ of the inner sleeve 18$^a$. As in the previous example, the outer sleeve 9$^a$ and cone-housing 12$^a$ have key-ways 25$^a$, 26$^a$, respectively, and are locked after assembly by a loose key 27$^a$ and screw 28$^a$.

The end of the rubber or like liner 29 is internally supported on a ferrule 32 formed with sharp-edged serrations 33 of buttress profile enabling the ferrule to be pushed into the end of the liner but resisting extraction of the ferrule, which also has an external flange 34 against which the end of the liner abuts. The outside diameter of the ferrule 32 is greater than the inside diameter of the liner 29 so that the latter must be stretched over the ferrule; and the liner is secured to the ferrule by a serving 36, the ends of which are tucked under the coils and twisted together, as shown at 37 in Figure 3. In the example illustrated, the serving is of wire and the twisted ends are soldered up. The ferrule 32 is slidingly supported on the inward extension of the inner sleeve 18$^a$ so that tension cannot be transmitted to the liner 29, and the end of the ferrule butts against the flange 21$^a$. The joint between the ferrule 32 and the sleeve 18$^a$ is sealed by a sealing ring 35 of rubber, neoprene or the like located in a groove formed in the sleeve 18$^a$.

In this embodiment, the external thread 10$^a$ for connecting the adaptor to a hose-coupling member, such as 38, is formed on an outward extension of the inner sleeve 18$^a$.

In order to provide an electrical bond between the coupling members, such as 38, at each end of the hose, the armouring wire 30, which is left intact within the split-cone 15$^a$ and the cone-housing 12$^a$, is electrically bonded to the inner sleeve 18$^a$, by straightening out its final coil and inserting it under the loose ring 16$^a$ and through holes drilled longitudinally through the abutment collar 17$^a$, spacer tube 31 and flange 21$^a$ of the inner sleeve 18$^a$ as shown at 30$^x$ in Figure 2, the end of the wire being secured in the flange 21$^a$ by means of soldering and a grub-screw 39, and cut off flush with the outer face of flange 21$^a$.

It may be noted that, in the example of Figure 1, the metallic liner 4 itself forms an electrical bond between the adaptors at opposite ends of the hose.

The method of assembly of the example of Figures 2 and 3 is similar to that of the example of Figure 1. After slipping the cone-housing 12$^a$ and loose ring 16$^a$ onto the hose and stripping back the armouring wire 30 to the required distance, unravelling the exposed part of the outer cover 6$^a$ and removing the unravelled circumferential strands 7$^a$ to expose the longitudinal strands 8$^a$, the latter are laid back over the ring 16$^a$ along the outside of the armoured cover. The abutment collar 17$^a$ is then slipped over the end of the liner 29 and the latter is cut off to the required length. The ferrule 32 is then inserted therein and secured by the serving 36. The spacer tube 31 is next placed in position and the inner sleeve 18$^a$ inserted into the ferrule 32. During the latter operations the last coil of the armouring wire which has previously been straightened and brought through the loose ring 16$^a$ is fed through the drilled holes 30$^x$ in the abutment collar and spacer tube and in the flange 21$^a$ of the inner sleeve 18$^a$. The halves of the split-cone 15$^a$ are then put in place and the cone-housing 12$^a$ driven up the taper 14$^a$. With the parts temporarily held in position, the end of the armouring wire is secured in the flange 21$^a$ by the grub-screw 39 and soldered up to make a good electrical connection, after which it is cut off flush with flange 21$^a$. Finally, the outer sleeve 9$^a$ is assembled and screwed home onto the cone-housing 12$^a$ to clamp the longitudinal strands 8$^a$ round the loose ring 16$^a$ between the split-cone and the abutment collar, and the locking key 27$^a$ is inserted and secured by the screw 28$^a$.

I claim:

1. An adaptor-assembly constituting the end connection of a flexible hose comprising a stress-carrying outer cover of woven fabric having longitudinal and transverse strands and a substantially unstressed fluid-tight liner, said adaptor-assembly comprising an outer sleeve inwardly flanged at one end and internally threaded at the other, a sleeve externally threaded to engage the thread of the outer sleeve and having a taper-bore whereby said externally threaded sleeve constitutes a cone-housing, a split sleeve externally tapered to fit the taper bore of the cone-housing, the mating tapers being cones of very small vertex angle, an abutment collar housed within the outer sleeve, an inner sleeve supporting the liner of the hose internally and having an outward flange retained between the inward flange of the outer sleeve and the abutment collar, and a loose ring which is located between the thick end of the split-cone and the abutment collar and round which the bared longitudinal strands of the outer cover of the hose are wrapped and laid back along the outside of the cover within the split-cone, so that when the outer sleeve and cone-housing are drawn together by screwing them one onto the other, the loose ring and the longitudinal strands of the cover wrapped round it are gripped between the split-cone and the abutment collar.

2. An adaptor-assembly as claimed in claim 1 as applied to a flexible-hose whose liner is of helically corrugated thin-walled metal tubing, in which the inner end of the inner sleeve is provided with a few turns of external screw-thread of rounded profile which enter the helical corrugations of the liner and the inner face of the flange of the inner sleeve is undercut to form a recess into which the extremity of the flexible liner is received and soldered.

3. An adaptor assembly as claimed in claim 2, in which the flange of the outer sleeve has an axial extension within which an extension of the inner sleeve lies, the joint between them being sealed by a sealing ring retained in an internal circumferential groove in the extension of the outer sleeve-flange.

4. An adaptor assembly as claimed in claim 3, in which the axial extension of the outer sleeve-flange has an external screw-thread.

5. An adaptor assembly as claimed in claim 1, as applied to a flexible hose whose liner is of inherently flexible material such as rubber, in which the end of the liner is provided with an internal ferrule having sharp-edged circumferential grooves engaging the inner surface of the liner, and the latter is bound to the ferrule by an external serving, the ferrule being free to slide on the outer surface of the inner sleeve which has a circumferential recess retaining a sealing ring, the sliding freedom of the ferrule on the inner sleeve being limited by abutment of the ferrule on the outward flange of the inner sleeve.

6. An adaptor assembly as claimed in claim 5, having a tubular spacer inserted between the flange of the inner sleeve and the abutment collar and surrounding the end of the liner where it is bound to the ferrule by the serving.

7. An adaptor assembly as claimed in claim 5, in which the inner sleeve has an external extension, an external screw-thread being formed thereon.

8. An adaptor assembly as claimed in claim 6, as applied to a flexible hose externally armoured with metal wire, in which the abutment collar, the spacer and the flange of the inner sleeve are drilled longitudinally, the end of the armouring wire being inserted through said drillings and secured in the inner-sleeve flange by means of a grub-screw and soldering.

9. An adaptor-assembly constituting the end connection of a flexible hose comprising a stress-carrying outer cover of woven fabric having longitudinal and transverse strands and a substantially unstressed fluid-tight liner; said adaptor-assembly comprising an inwardly flanged sleeve and a sleeve having a taper-bore, said sleeves being in threaded engagement for relative longitudinal telescoping movement, an externally tapered split sleeve within the taper-bore of said second named sleeve, an abutment collar in longitudinal alignment with said spilt sleeve, a flanged inner sleeve supporting the liner of the hose internally and retained by engagement of its flange between the inward flange of the first mentioned sleeve and the abutment collar, and a loose ring which is located between the thick end of the split-sleeve and the abutment collar and round which the bared longitudinal strands of the outer cover of the hose are wrapped and laid back along the outside of the cover within the split-sleeve, whereby when the first and second mentioned sleeves are drawn together by screwing them one onto the other, the loose ring and the longitudinal strands of the cover wrapped round it are clamped between the split-sleeve and the abutment collar.

PERCY RAYMOND ALLISON.

REFERENCES CITED

The following references are of record in the file of this patent:

UNITED STATES PATENTS

| Number | Name | Date |
|---|---|---|
| 995,209 | Witzenmann | June 13, 1911 |
| 2,273,398 | Couty et al. | Feb. 17, 1942 |
| 2,298,736 | Harpfer | Oct. 13, 1942 |
| 2,384,635 | Melsom | Sept. 11, 1945 |
| 2,452,728 | Carling | Nov. 2, 1948 |
| 2,490,686 | Guarnaschelli | Dec. 6, 1949 |